United States Patent [19]
Ungnadner et al.

[11] 4,018,517
[45] Apr. 19, 1977

[54] MOTION PICTURE CAMERA

[75] Inventors: Peter Ungnadner, Unterhaching; Wolfgang Geisslinger, Munich, both of Germany

[73] Assignee: AGFA-Gevaert, A.G., Leverkusen, Germany

[22] Filed: May 8, 1975

[21] Appl. No.: 575,634

[30] Foreign Application Priority Data

May 10, 1974 Germany .......................... 2422716

[52] U.S. Cl. .................................. 352/72; 352/29
[51] Int. Cl.[2] ...................................... G03B 23/02
[58] Field of Search ........................ 352/72, 29, 27

[56] References Cited

UNITED STATES PATENTS

| | | | |
|---|---|---|---|
| 3,421,422 | 1/1969 | Winkler | 352/72 |
| 3,625,125 | 12/1971 | Iida | 352/72 |
| 3,825,327 | 7/1974 | Kosarko | 352/74 |
| 3,880,504 | 4/1975 | Marvin | 352/72 |

OTHER PUBLICATIONS

Defensive Publication, T920009, Kosarko, Mar. 5, 1974 pp. 352-372.

Primary Examiner—Monroe H. Hayes
Attorney, Agent, or Firm—Michael J. Striker

[57] ABSTRACT

A motion picture camera for use with regular motion picture film or with motion picture film having a sound track and being stored in containers larger than those for the storage of regular film so that, when the chamber in the body of the camera received a small container, such small container leaves unoccupied a portion of the chamber which is occupied when the chamber receives a large container. A properly inserted large container deforms a leaf spring which extends into the aforementioned portion of the chamber whereby the thus deformed leaf spring enables a first lever to permit the pivoting of a second lever under the action of a torsion spring. The second lever moves a roller into engagement with film in a properly inserted large container opposite a rotary element which is adjacent to a sound head of the sound recording mechanism in the camera body. The roller can be disengaged from film in a large container in response to rotation of a knob constituting a component part of a locking device for a cover which must be opened in order to afford access to the chamber in the camera body.

6 Claims, 1 Drawing Figure

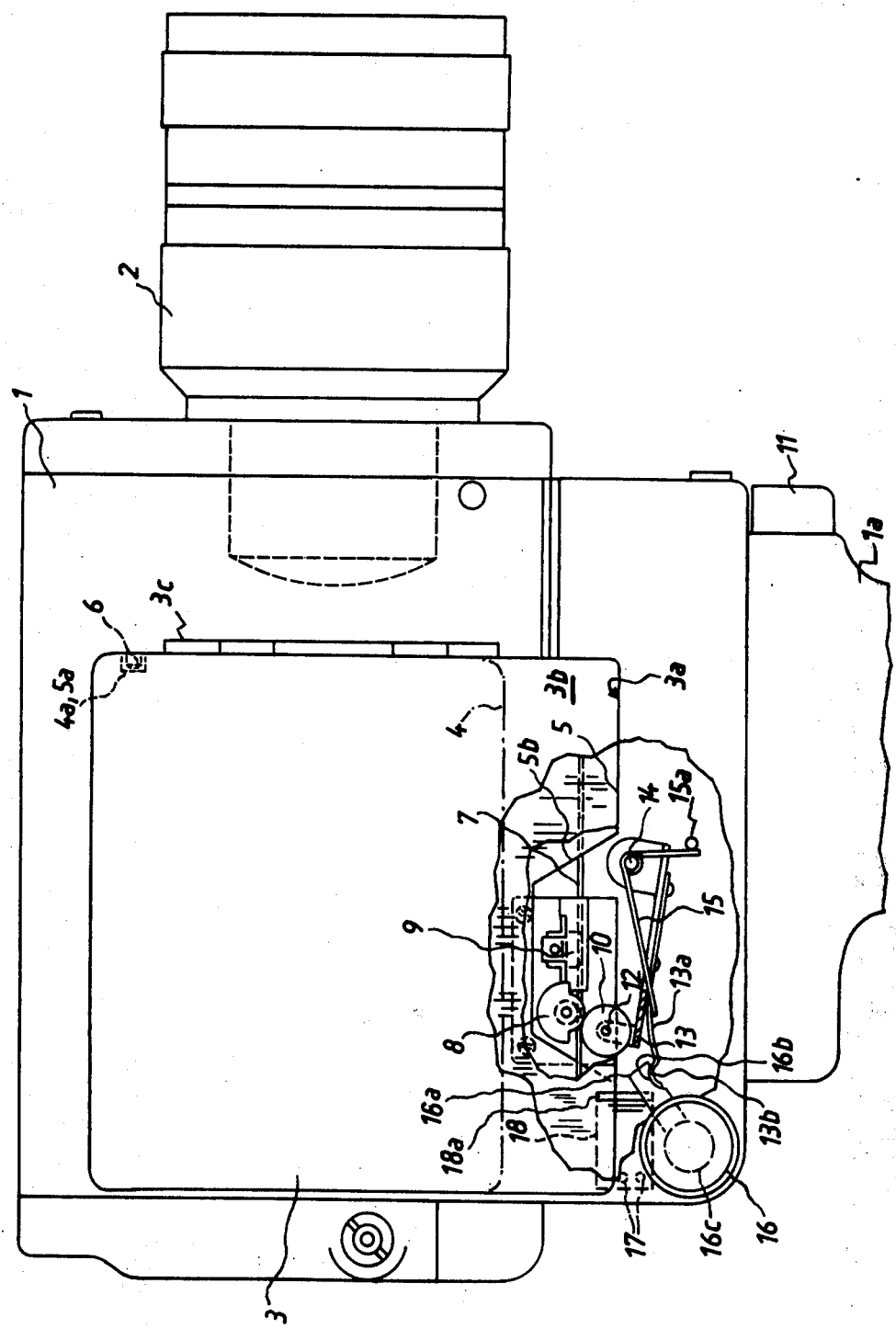

MOTION PICTURE CAMERA

BACKGROUND OF THE INVENTION

The present invention relates to motion picture cameras in general, and more particularly to improvements in motion picture cameras which can accept different types of containers or magazines for motion picture film. Still more particularly, the invention relates to improvements in cameras which embody a sound recording mechanism and can accept relatively small containers for regular motion picture film (e.g., containers known as Super 8 cassettes) or relatively large containers for motion picture film having a sound track (e.g., Super 8 sound film cassettes).

The sound recording mechanism of a motion picture camera normally comprises a roller or an analogous rotary element which must engage motion picture sound film in a container for such film not later than when the user actuates the camera release. As a rule, the roller of the sound recording mechanism is caused to engage the film in response to actuation of the camera release whereby the roller engages the film opposite a second rotary element and/or opposite the recording head of the sound recording mechanism. A drawback of such motion picture cameras in that the actuation of camera release necessitates the exertion of a relatively large force which cannot be applied by remote control, such as when the release is to be actuated by a flexible shaft or cable and/or by wireless remote control actuating means. Furthermore, in such conventional cameras, the roller is moved toward the other rotary element and/or head of the sound recording mechanism irrespective of whether the chamber contains a container for regular film or a container for film having a sound track, i.e., the roller is caused to move to an extended position in response to each and every actuation of the camera release. This causes unnecessary wear upon the means for moving the roller.

SUMMARY OF THE INVENTION

An object of the invention is to provide a novel and improved camera for use with motion picture film with or without sound tracks wherein the component parts of the sound recording mechanism are or must be moved only when the camera body contains a magazine or container which stores film having a sound track.

Another object of the invention is to provide a motion picture camera wherein the movable portion or portions of the sound recording mechanism automatically assume optimum positions with respect to the film as soon as the camera receives a container for motion picture film having a sound track, and wherein such movable portion or portions of the sound recording mechanism need not be displaced by or in response to actuation of the camera release so that the actuation of camera release necessitates the exertion of a relatively small force.

A further object of the invention is to provide a motion picture camera wherein the movable portion or portions of the sound recording mechanism need not be pivoted, shifted or otherwise moved when the camera body receives a container for regular motion picture film.

An additional object of the invention is to provide a novel and improved control system for the movable portion or portions of the sound recording mechanism in a motion picture camera.

Still another object of the invention is to provide a motion picture camera with novel and improved means for locking the cover for the film receiving chamber in the camera body.

A further object of the invention is to provide a motion picture camera wherein the means for moving the movable portion or portions of the sound recording mechanism occupies little room and comprises a small number of simple, inexpensive, rugged and readily accessible components.

The invention is embodied in a motion picture camera, particularly in a camera for 8-millimeter motion picture film. The camera comprises a housing or body having a chamber for reception of relatively small (regular) and relatively large (sound film) containers or magazines for motion picture film whereby a portion of the chamber remains unoccupied when the chamber receives a relatively small film container. The camera further comprises a blocking device (e.g., a leaf spring or a lever) which is mounted in the housing and extends into the aforementioned portion of the chamber so that a large container moves the blocking device from a first to a second position when such large container is properly inserted into the chamber, a sound recording mechanism mounted in the housing and having a portion (e.g., a roller or an analogous rotary element) which is movable from a retracted position to an extended position of engagement with film in a properly inserted large container, and control means for effecting or permitting the movement of the roller from the retracted to the extended position in response to movement of the blocking device from the first to the second position.

The sound recording mechanism in the housing of the motion picture camera comprises a second portion which is contacted by the sound track of the film in a large container in the chamber in response to movement of the roller to its extended position.

The control means may comprise a lever or an analogous control member which is movable along a predetermined path between operative and inoperative positions to thereby respectively effect the movement of the roller to the extended and retracted positions; the blocking device extends into the path of movement of the control member to thereby prevent the movement of such member to operative position when the blocking device assumes its first position. The control means may further comprise a torsion spring or analogous means for permanently biasing the roller to the extended position and means for moving the roller to the retracted position through the medium of the control member. The means for moving the roller to the retracted position may comprise a rotary knob or analogous handgrip means which is accessible at the exterior of the housing and a lever or an analogous carrier for the roller. The carrier is acted upon by the biasing means of the control means and is movable against the opposition of such biasing means by the handgrip means through the medium of the control member.

The novel features which are considered as characteristic of the invention are set forth in particular in the appended claims. The improved motion picture camera itself, however, both as to its construction and its mode of operation, together with additional features and advantages thereof, will be best understood upon perusal of the following detailed description of certain specific embodiments with reference to the accompanying drawing.

BRIEF DESCRIPTION OF DRAWING

The single FIGURE is a fragmentary partly elevational and partly sectional view of a motion picture camera which embodies the invention.

DESCRIPTION OF THE PREFERRED EMBODIMENTS

The drawing shows a portion of a motion picture camera having a housing or body 1, a picture taking lens 2 mounted on or in the front wall of the body 1, a pistol grip handle 1a at the underside of the body 1, and a depressible release button 11 in the front upper portion of the handle 1a.

One side wall of the body 1 has a removable or pivotably mounted portion on cover 3 (here shown as being secured to the main portion of the body 1 by a hinge 3c) which can be moved between a closed position (shown) and an open position in which it affords access to a chamber 3a for magazines or containers containing motion picture film. The chamber 3a can receive relatively small magazines 4 which contain regular motion picture film without a sound track and relatively large magazines 5 for motion picture film 7 which has a sound track (not specifically shown). The front panel of a magazine 4 has a recess 4a for a locating pin 6 which is mounted in the body 1 and enters the recess 4a when a magazine 4 is properly inserted into the chamber 3a. The same pin 6 can extend into a similar recess 5a in the front panel of a magazine 5 when the latter is properly inserted into the chamber 3a. In the illustrated motion picture camera, the magazine 5 (which is shown by solid lines) practically or completely fills the chamber 3a. On the other hand, a regular magazine 4 (indicated by phantom lines) fills only a major portion of the chamber 3a while leaving the lower portion 3b of this chamber unoccupied.

The lower panel of the magazine 5 has a cutout or recess 5b which affords access to a portion of motion picture film 7 therein. When the magazine 5 is properly inserted into the chamber 3a, a portion of the sound recording mechanism in the body 1 of the motion picture camera automatically enters the cutout 5b behind the accessible portion of the film 7 (i.e., above such film portion, as viewed in the drawing). This portion of the sound recording mechanism comprises a sound recording head 9 and a rotary element 8. Another portion of the sound recording mechanism in the body 1 comprises a rotary element 10 which must bear against the accessible portion of film 7 opposite the rotary element 8 or head 9. In the illustrated embodiment, the rotary element 10 (hereinafter called roller for short) bears against the film 7 opposite the rotary element 8. The sound track of the film 7 is in register with the sound head 9.

In presently known cameras for use with motion picture film having a sound track, the roller is moved against the rotary element or sound recording head only in response to actuation of the camera release. Such cameras exhibit the aforediscussed disadvantages, especially as concerns the magnitude of forces which must be applied in order to actuate the camera release. In accordance with the present invention, the roller 10 automatically engages the film 7 opposite the rotary element 8 when the magazine 5 is properly inserted into the chamber 3a and the chamber is properly sealed by the cover 3. To this end, the roller 10 is mounted on a pin 12 which is carried by the free end of a lever 13. The latter is fulcrumed in the body 1 on a pivot member 14 and is biased clockwise, as viewed in the drawing, by a torsion spring 15 reacting against a post 15a in the interior of the body 1. The carrier lever 13 is rigid with an elastic extension 13a (e.g., a leaf spring which is soldered or riveted to the lever) which comprises a curved end portion or protuberance 13b receivable in a complementary notch 16b of a control lever 16a which is rotatable by a handgrip member or knob 16, preferably through the intermediary of a suitable friction clutch 16c (indicated by broken lines). The handgrip portion or knob 16 may constitute a component part of means for releasably locking the cover 3 in closed position. A blocking device, here shown as a leaf spring 18, is secured to the body 1 by rivets 17 or analogous fasteners and has a bent-over end portion 18a which can extend into the path of counterclockwise movement of the control lever 16a under the action of the knob 16 and/or torsion spring 15. A portion of the leaf spring 18 and its end portion 18a extends into the lower portion 3b of the chamber 3a so that the spring 18 is flexed from a first or unstressed position (in which the portion 18a can intercept the control lever 16a) to a second or stressed position (shown in the drawing) when the magazine 5 is properly inserted into the camera body 1 (and not later than when the cover 3 is returned to the closed position). It will be noted that the torsion spring 15 permanently biases the carrier lever 13 in a direction (clockwise) to move the roller 10 against the accessible portion of the film 7 opposite the rotary element 8 of the sound recording mechanism, i.e., to move the roller 10 from a retracted to an extended position.

In order to allow for opening of the cover 3, the knob 16 must rotate clockwise, as viewed in the drawing, so that the carrier lever 13 is pivoted counterclockwise through the medium of the extension 13a and control lever 16a whose notch 16b receives the protuberance 13b. Thus, the roller 10 is automatically moved away from the rotary element 8 so that the magazine 5 (with exposed or partly exposed film 7 therein) can be readily removed from the chamber 3a. As the knob 16 rotates clockwise, the control lever 16a moves out of register with the bent-over end portion 18a so that the leaf spring 18 can reassume its first or unstressed position, not later than upon removal of the magazine 5 from the camera body 1. The end portion 18a then extends into the path of counterclockwise movement of the control lever 16a and prevents the movement of carrier lever 13 and roller 10 to the extended positions shown in the drawing.

If the user of the camera thereupon inserts a smaller magazine 4, the pin 6 enters the recess 4a as soon as the magazine 4 is properly inserted into the chamber 3a. However, the magazine 4 does not fill the lower portion 3b of the chamber 3a; in fact, the lower panel of the properly inserted magazine 4 is located at least slightly above the portion 8, 9 of the sound recording mechanism. The magazine 4 does not depress or deform the leaf spring 18 so that the end portion 18a continues to extend into the path of movement of the control lever 16a. Consequently, when the user thereupon moves the cover 3 back to the closed position and rotates the knob 16 counterclockwise in order to lock the cover 3 in such closed position, the knob 16 rotates relative to the control lever 16a (see the friction clutch 16c). This insures that the cover 3 can be locked irrespective of whether the chamber 3a contains a smaller magazine 4 or a larger magazine 5. The control lever 16 continues to maintain the carrier lever 13 and roller 10 in their retracted positions in which the roller 10 is remote from the rotary element 8 and recording head 9.

If the user thereupon removes the magazine 4 and replaces it with a magazine 5, the casing of the magazine 5 depresses and stresses the leaf spring 18 so that the end portion 18a is disengaged from the control lever 16a. The latter is then free to move back to the illustrated operative position, either under the action of the torsion spring 15 (which may be made strong enough to pivot the carrier lever 13 clockwise and to simultaneously pivot the control lever 16a anticlockwise as soon as the control lever 16a is disengaged from the end portion 18a) or under the action of the knob 16 which is rotatable by hand to and from the position which is shown in the drawing. Thus, the roller 10 automatically engages the film 7 opposite the rotary element 8 as soon as a magazine 5 is properly inserted into the chamber 3a. The camera is ready to make exposures with simultaneous recording of sound as soon as the user depresses the release 11. If desired, the knob 16 may also serve as a means for moving the portion 8, 9 of the sound recording mechanism from a retracted position to the operative position which is shown in the drawing and/or for moving a customary pressure plate (not shown) to the operative position behind the film gate (i.e., behind the lens 2) in response to such rotation of the knob 16 as is needed to lock the cover 3 in the closed position. In other words, the knob 16 can perform one or more functions including locking or unlocking the cover 3, moving the roller 10 to or from the illustrated extended position, moving the portion 9, 10 of the sound recording mechanism to or from operative position and moving the pressure plate for film 7 to or from operative position.

The parts 13, 14, 15, 16, 16a together constitute the aforementioned control means and the parts 13, 16 constitute a device for moving the roller 10 to the retracted position through the medium of the clutch 16c and control lever 16a.

The improved motion picture camera is susceptible of many modifications without departing from the spirit of the invention. For example, the knob 16 need not serve to lock or unlock the cover 3; instead, the knob 16 may be used exclusively as a means for causing the control lever 16a to disengage the roller 10 from the film 7 or to cause or permit the movement of carrier lever 13 and roller 10 back to the illustrated extended positions. In other words, the knob 16 may be rotated subsequent to unlocking of the cover 3 and subsequent to movement of the cover 3 to the open position. The aforedescribed construction (in which the knob 16 forms part of a means for locking or unlocking the cover 3) is preferred at this time because the user need not manipulate two discrete handgrip means. Furthermore, the leaf spring 18 may be replaced by another blocking device, e.g., by lever which is fulcrumed in the camera body and is under the bias of a relatively weak spring tending to move a portion of the lever into the path of counterclockwise movement of the control lever 16a. Still further, the lever 13 can be replaced by a slide or an analogous carrier which is reciprocable, rather than pivotable, between a retracted and an extended position.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptations should and are intended to be comprehended within the meaning and range of equivalence of the claims.

What is claimed as new and desired to be protected by Letters Patent is set forth in the appended claims:

1. In a motion picture camera, particularly in a motion picture camera for 8-millimeter film, a combination comprising a bousing having a chamber for reception of relatively small and relatively large film containers whereby a portion of said chamber remains unoccupied when said chamber receives a large container; a blocking device movably mounted in said housing and extending into said portion of said chamber so that a large container moves said device from a first to a second position when such large container is properly inserted into said chamber; a sound recording mechanism mounted in said housing and having a portion movable from a retracted position to an extended position of engagement with film in a large container in said chamber; control means for effecting or permitting the movement of said portion of said mechanism from said retracted to said extended position in response to movement of said blocking device from said first to said second position, comprising a control member which is movable along a predetermined path between operative and inoperative positions to thereby respectively effect the movement of said portion of said mechanism to said extended and retracted positions, said blocking device extending into said path to thereby prevent the movement of said control member to said operative position when said device assumes said first position thereof, means for permanently biasing said portion of said mechanism to said extended position, and means for moving said portion of said mechanism to said retracted position through the medium of said control member, including a handgrip portion accessible at the exterior of said housing and a carrier for said last mentioned portion, said carrier being biased by said biasing means and being movable against the opposition of said biasing means by said handgrip means through the medium of said control member; and a friction clutch interposed between said handgrip means and said control member so that said handgrip means is movable by hand with and independently of said control member.

2. A combination as defined in claim 1, wherein the film in a relatively large container has at least one sound track and said mechanism further comprises a second portion which is contacted by the sound track of a film in a large container in said chamber in response to movement of the portion of said mechanism to said extended position.

3. A combination as defined in claim 1, wherein said portion of said mechanism is a rotary element.

4. A combination as defined in claim 1, wherein said blocking device comprises a resilient element which is deformable by a large magazine in said chamber to thereby assume said second position thereof.

5. A combination as defined in claim 1, wherein said blocking device comprises a lever which is pivotable between said first and second positions.

6. A combination as defined in claim 1, further comprising a cover for said chamber, said cover being movable between open and closed positions in which said chamber is respectively accessible and sealed, and means for locking said cover in said closed position, said locking means including said handgrip means.

* * * * *